United States Patent
Farneth et al.

(10) Patent No.: US 7,615,293 B2
(45) Date of Patent: *Nov. 10, 2009

(54) FUEL CELL ELECTRODE WITH REDOX CATALYST

(75) Inventors: William E. Farneth, Wilmington, DE (US); Michael B. Damore, Wilmington, DE (US); Mark Andrew Harmer, Kennett Square, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 845 days.

This patent is subject to a terminal disclaimer.

(21) Appl. No.: 10/932,371

(22) Filed: Sep. 1, 2004

(65) Prior Publication Data

US 2005/0074663 A1 Apr. 7, 2005

Related U.S. Application Data

(60) Provisional application No. 60/508,424, filed on Oct. 3, 2003.

(51) Int. Cl.
 *H01M 8/16* (2006.01)
 *H01M 4/00* (2006.01)
 *C12M 1/00* (2006.01)

(52) U.S. Cl. .......................... 429/12; 429/40; 435/817; 204/403.01

(58) Field of Classification Search ........................ None
See application file for complete search history.

(56) References Cited

U.S. PATENT DOCUMENTS

| 4,224,125 | A | 9/1980 | Nakamura et al. |
| 6,294,281 | B1 | 9/2001 | Heller |

FOREIGN PATENT DOCUMENTS

| EP | 0 177 743 A2 | 4/1986 |
| EP | 0 177 743 B1 | 11/1991 |

OTHER PUBLICATIONS

Habermuller et al., Electron-transfer mechanisms in amperometric biosensors, Fresenius J. Anal. Chem., vol. 366:566-568, 2000.
Scott Calabrese Barton et al., The "Wired" Laccase Cathode: High Current Density Electroreduction of O2 to Water at +0.7 V (NHE) at pH 5, J. Am. Chem. Soc., vol. 123:5802-5803, 2001.
Scott Calabrese Barton et al., Electroreduction of O2 to Water on the "Wired" Laccase Cathode, J. Phys. Chem. B, vol. 105:11917-11921, 2001.
S. V. Morozov et al., Direct and electrically wired bioelectrocatalysis by hydrogenase from *Thiocapsa roseopersicina*, Bioelectrochemistry, vol. 55:169-171, 2002.

(Continued)

*Primary Examiner*—Patrick Ryan
*Assistant Examiner*—Keith Walker (57) ABSTRACT

The invention is directed to an electrode, suitable for use in a fuel cell, consisting of a microporous current collector incorporating a multitude of domains and wherein each domain contains soluble redox catalyst.

15 Claims, 3 Drawing Sheets

Schematic of Electrode

OTHER PUBLICATIONS

Seiya Tsujimura et al., Bioelectrocatalysis-based dihydrogen/dioxygen fuel cell operating at physiological pH, Phys. Chem. Chem. Phys., vol. 3:1331-1335, 2001.

A. A. Karyakin et al., Hydrogen fuel electrode based on bioelectrocatalysis by the enzyme hydrogenase, Electrochemistry Communications, vol. 4:417-420, 2002.

Itamar Willner et al., A biofuel cell based on pyrroloquinoline quinone and microperoxidase-11 monolayer-functionalized electrodes, Bioelectrochemistry and Bioenergetics, vol. 44:209-214, 1998.

Francis Trudeau et al., Reagentless Mediated Laccase Electrode for the Detection of Enzyme Modulators, Anal. Chem., vol. 69:882-886, 1997.

Eugenii Katz et al., A non-compartmentalized glucose O2 biofuel cell by bioengineered electrode surfaces, Journal of Electroanalytical Chemistry, vol. 479:64-68, 1999.

Chen Ting et al., A Miniature Biofuel Cell, J. Am. Chem. Soc., vol. 123:8630-8631, 2001.

G. Tayhas R. Palmore et al., Electro-enzymatic reduction of dioxygen to water in the cathode compartment of a biofuel cell, Journal of Electroanalytical Chemistry, vol. 464:110-117, 1999.

Takaaki Nakagawa et al., Bilirubin Oxidase and [Fe(CN)6]3-/4- Modified Electrode Allowing Diffusion-Controlled Reduction of O2 to Water at pH 7.0, Chemistry Letters, vol. 32(1):54-55, 2003.

Mano, Nicolas et al., A Miniature Membraneless Biofuel Cell Operating at 0.36 V under Physiological Conditions, Journal of The Electrochemical Society, 2003, pp. A1136-A1138, vol. 150, No. 8, The Electrochemical Society, Inc.

International Search Report, International Application No. PCT/US04/32623; International Filing Date: Oct. 1, 2004; Date of International Search Report: Feb. 28, 2008.

FIGURE 1
Schematic of Electrode

FIGURE 2
Schematic of Electrode Domains

FIGURE 3

Schematic of fuel cell

FUEL CELL ELECTRODE WITH REDOX CATALYST

This patent application claims the benefit of U.S. Provisional Application 60/508424, filed Oct. 3, 2003.

FIELD OF INVENTION

The invention is directed to a fuel cell electrode. Specifically, the electrode consists of a microporous current collector incorporating a multitude of domains, wherein each domain contains a soluble redox catalyst.

BACKGROUND

There is much interest in renewable power generation, particularly fuel cells. A fuel cell is an energy conversion device that invariably comprises two electrodes, i.e., a cathode and an anode, upon which electrochemical reactions occur to enable the transformation of stored chemical energy into electrical energy. Fuel (e.g., hydrogen, methanol) is oxidized at the anode to release electrons that are then routed through an external circuit, while protons are transported through a proton exchange membrane to the cathode. The circuit is completed inside the fuel cell when the electrons are received back again from the external circuit at the cathode, where they combine with protons and oxygen atoms in a reduction reaction to produce water. The output of the fuel cell then is electrical energy and heat, produced by the production of water from protons and oxygen.

Typically, catalysts are incorporated into the anode and cathode electrodes to facilitate fuel oxidation and oxygen reduction. Current preferred catalysts for fuel cells are particulate noble metals; however, these metals are expensive, inherently inefficient, non-renewable and not easily characterized. For these reasons, substitution of noble metals with homogeneous redox catalysts is a desirable goal; but, low current densities (which result in inadequate power and/or volume) have made this approach uneconomical with previously disclosed systems.

Use of enzymatic catalysts permit the incorporation of the redox catalyst into fluidic microdomains and thereby makes higher current densities possible due to: 1.) locally high concentrations of catalyst (since the catalyst is not confined to one monolayer density); 2.) high electron diffusion coefficients; and, 3.) opportunities for convective transport. Additionally a redox catalyst that is enzymatic can easily use bio-available energy sources such as glucose.

The redox enzyme in an enzymatic biofuel cell participates in an electron transfer chain at the anode by oxidizing the fuel. However, redox enzymes are incapable of direct contact with the electrode since their redox centers are insulated from the conductive support by their protein matrices (Katz et al., "Biochemical fuel cells", In *Handbook of Fuel Cells—Fundamentals, Technology and Applications*, 1, Ch. 21 (2003)). In order to bring these enzymes into contact with the electrode and to improve the electron transfer rate, an initially oxidized electron transport redox mediator is used to reoxidize the enzyme. The electrons are then transferred to the anode and the mediator is once again oxidized. A similar process occurs at the cathode.

Numerous examples of enzymatic biofuel cells are described in the literature; however, existing work in this area either does not utilize the redox catalyst within the pores of the electrode or does not allow for unconstrained mobility of the electrochemical reagents within the pores of the electrode. For example, U.S. Pat. No. 4,224,125 teaches the use of oxidoreductase enzymes and electron transport mediators (ETMs) immobilized in the neighborhood of a current collector. However, the ETM is in the form of a redox polymer, and the redox catalyst is immobilized. EP 0,177,743 B1 provides for an immobilized redox catalyst and an ETM coated onto a carrier that forms part of the electrode. But, the electrochemical reaction occurs within a fluid volume between a film coated over the electrode external surface and the macroscopic surface of the electrode and not throughout the electrode volume. U.S. Pat. No. 6,294,281 teaches the use of enzymes as fuel cell catalysts together in both the anode and the cathode of a biological fuel cell by immobilization of the enzymes within a silica gel and subsequent application to an electrode surface in combination with a redox hydrogel that functions as an ETM. Electrodes like those described in U.S. Pat. No. 4,224,125 and EP 0 177743 B1 find use in sensor applications, but immobilization of the catalyst and/or ETM and restricted access of the electrochemical reagents to the redox catalyst immobilized inside the electrode limit the current densities that can be obtained in fuel cell applications. Fuel cells like those described in U.S. Pat. No. 6,294,281 are designed for use in vivo at low power and also produce current densities that are limited by the rates of electron and electrochemical reagent transport.

The open literature describes enzymatic biofuel cells that suffer from similar deficiencies to those described above, where commercial practicability is limited due to low current densities, resulting from immobilization of the redox catalyst and/or ETM and restricted access of the electrochemical reagents to the redox catalyst immobilized inside the electrode. For example:

Habermuller et al. (*Fresenius J Anal Chem*, 2000, 366:560-568) describe various electrode architectures for use in amperometric biosensors. They discuss: 1.) problems with electron transfer between electrode and enzyme; and 2.) how immobilization, monolayer formation and ETM diffusion can all contribute to the total current obtained.

Barton et al. (*J. Phys. Chem. B.*, 2001, 105(47):11917-11921 and *J. Amer Chem Soc.* 2001, 123:5802-5803) describe a laccase cathode consisting of laccase immobilized in a non-fluidic redox polymer with no domain structure. Evidence is presented for transport-limited currents.

Palmore et al. (*J. Electroanalytical Chem.*, 1999, 464:110-117) describe a biofuel cell utilizing laccase as the cathode electrocatalyst with ABTS as ETM. The cathode is an entirely homogeneous solution with no enzyme or ETM confinement and no microdomain formation.

Tsujimura et al. (*Phys. Chem. Chem. Phys.*, 2001, 3:1331-1335) describe a biofuel cell using carbon felt electrodes with a laccase/ABTS homogeneous solution as the cathode electrolyte, and bacterial cells that metabolize $H_2$ on the anode. They demonstrate fuel cell performance but no method for microdomain formation.

A. A. Karyakin et al. (*Electrochemistry Communications*, 2002, 4:417-420) describe a fuel cell anode wherein hydrogenase from *T. roseopersicina* is immobilizzed at the surface of "carbon filament material", probably carbon paper or cloth. The electrode does not employ an ETM and does not describe domains. Because of the monolayer interaction at the electrode surface, the current is limited.

S. V. Morozov et al. (*Bioelectrochemistry*, 2002, 55:169-171) describe a similar system to that of Karyakin et al. (supra), except the enzyme is immobilized but not in fluidic media, and there are no domains. Electron transfer rates are slow because of a polymeric ETM.

Chen et al. (*J. Am. Chem. Soc.*, 2001, 123:8630-8631) describe a biofuel cell based upon enzyme systems at both the cathode and anode. The enzyme is immobilized in a redox polymer. The electron transfer rates are again slow because of a polymeric ETM.

Katz et al. (*J. Electroanalytical Chem.*, 1999, 479:64-68) describe a biofuel cell consisting of monolayered enzyme cathode and anode. There is no description of fluidic domains, and the current is limited by monolayer coverage.

Trudeau et al. (*Analytical Chemistry*, 1997, 69:882-886) describe covalent immobilization of laccase and ETM in a hydrogel. The laccase and ETM are bound and the domains are not defined. The immobilization limits the effective concentration of laccase and ETM and limits the rate of electron transfer.

Willner et al. (*Bioelectrochemistry and Bioenergetics*, 1998, 44:209-214) describe a biofuel cell with electrodes that utilize covalently linked ETMs and free enzyme in solution. Domains are not indicated and the ETM is immobilized covalently.

Katz et al. (*New J of Chemistry*, 1999, 5:481-487) describe a similar biofuel cell to that of Willner et al. (supra), except that the enzyme is covalently linked through a molecular wire onto the electrode.

Nakagawa et al. (*Chemistry Letters* 2003, 32:54-55) describe an enzyme electrode using bilirubin oxidase and $[Fe(CN)_6]^{3-/4-}$ as enzyme and ETM. Both are trapped on a glassy carbon electrode. No domain structure and no porous electrode is indicated. Diffusion-limited currents are obtained.

Each of the electrodes described above are useful in small fuel cell applications; however, all suffer from the deficiency of low current densities and are not commercially practicable.

Thus, a need exists for the development of a redox catalyst- or enzymatic redox catalyst-based electrode capable of generating useful current densities. Applicants have solved the stated problem by the design of a fuel cell electrode that comprises the redox catalyst and substrate in fluid association with each other within a microdomain of the electrode.

SUMMARY OF THE INVENTION

The invention is directed to a fuel cell electrode comprising a porous current collector in contact with a multitude of domains, each domain containing a redox catalyst and an electron transport mediator. Neither the catalyst nor the electron transport mediator are immobilized in any fashion but instead are in fluid association with each other within the domain. The fluid association of these elements of the electrode is unique and responsible for a more efficient system than heretofore described. Additionally, the size of the domain within which the electron transport mediator and redox catalyst reside is controlled to be about 10 to about 100 μm, giving particularly suitable results.

Accordingly it is within the context of the present invention to provide a fuel cell electrode comprising a porous current collector in contact with a multitude of domains, each domain containing:

a) a redox catalyst; and
b) an electron transport mediator;

wherein the catalyst and electron transport mediator are in fluid association with each other within the domain.

In one embodiment the domain that contains the redox catalyst and the electron transport mediator is bounded by a porous current collector and a non-conducting containment material whereas in an alternate embodiment the domain boundary is formed by the juxtaposition of one or more current-collecting materials.

Additionally the invention provides a fuel cell comprising the electrode of the invention where the electrode may function either as a cathode or an anode.

In one embodiment the invention provides a fuel cell comprising the electrode of the invention.

In a specific embodiment the invention provides a fuel cell comprising:

(i) an anode configured and arranged for electro-oxidizing an anode reductant; and
(ii) a cathode spaced apart from the anode and configured and arranged for electro-reducing a cathode oxidant, the cathode comprising a porous current collector comprising an electrical conducting material, in contact with a multitude of domains, each domain containing:
    a) a redox catalyst; and
    b) an electron transport mediator;

wherein the redox catalyst and electron transport mediator are in fluid association with each other within the domain and wherein the redox catalyst and the electron transport mediator are bounded in the domain by the porous current collector and a containment material; and
wherein the diameter of the domain is less than about 100 μm.

Similarly the invention provides a fuel cell comprising:

(i) a cathode configured and arranged for electro-reducing a cathode oxidant; and
(ii) an anode spaced apart from the cathode and configured and arranged for electro-oxidizing an anode reductant, the anode comprising a porous current collector comprising an electrical conducting material, in contact with a multitude of domains, each domain containing:
    a) a redox catalyst; and
    b) an electron transport mediator;

wherein the redox catalyst and electron transport mediator are in fluid association with each other within the domain and wherein the redox catalyst and the electron transport mediator are bounded in the domain by the porous current collector and a containment material; and
wherein the diameter of the domain is less than about 100 μm.

Additionally the invention provides a portable electronic device comprising the fuel cell of the invention.

DETAILED DESCRIPTION OF THE INVENTION

The invention provides an electrode, suitable for use in a fuel cell. The electrode herein consists of a microporous current collector incorporating a multitude of domains, wherein each domain contains a homogeneous redox catalyst and an electron transport mediator in fluid association with each other. Neither the catalyst nor the electron transport mediator are immobilized in any fashion within the domain; this unique association overcomes problems associated with low current densities and thereby makes the electrode herein much more efficient in a fuel cell than previously described systems. The electron transport mediator is useful for electron transport between the redox catalyst and electrode surface. Preferably each domain is no more than about 100 μm across. The electrode has the advantage of being free of noble metals, improving the performance of the present fuel cell as compared with the art.

There is a need for new power sources for increasingly sophisticated portable electronic equipment. Fuel cells (and particularly, direct methanol fuel cells) are under development to meet this need. The electrode of the present invention is particularly useful in fuel cells for portable power generation as either the anode or the cathode or both. Furthermore, the electrode described herein can be used in place of noble metal-catalyzed electrodes that are currently used in fuel cells for portable electronic equipment, thereby providing advantages in terms of cost, reduced operating temperatures, design simplification and sustainability. Generally, the electrode needs to be able to deliver on the order of 10-100 mA/cm$^2$ of electrode surface to be useful in portable power generation applications.

The present electrode is designed to operate in a fuel cell capable of using compounds from biological systems as fuel; e.g., fuel cells can be made that oxidize biochemicals available in the body of an animal, a plant or in plant residue.

Definitions

The following definitions may be used for the interpretation of the specification and the claims:

"Electron transport mediator" is abbreviated as ETM.

"2,2'-azinobis(3-ethylbenzothiazoline-6-sulfonate)" is abbreviated as ABTS.

"Redox reaction" or "reduction-oxidation reaction" means a reaction in which electrons are transferred between species or in which atoms change oxidation number. The electron-donating molecule is the "reducing agent" or "reductant"; the electron-accepting molecule is the "oxidizing agent" or "oxidant". Reducing and oxidizing agents function as conjugate reductant-oxidant pairs or redox pairs; thus, they undergo the reaction: Oxidant+n e$^-$→Reductant; and Reductant→Oxidant+n e$^-$. The term "substrate molecules" will refer to reductant and/or oxidant.

"Redox catalyst" means a catalyst that catalyzes a redox reaction.

"Electrode" refers to an electric conductor through which an electric current enters or leaves a medium, whether it be an electrolytic solution, solid, molten mass, gas or vacuum.

"Cathode" means the electrode to which electrons migrate from the outside circuit and is the electrode where reduction occurs.

"Anode" means the electrode from which electrons migrate from the outside circuit and is the electrode where oxidation occurs.

"Current collector" refers to the object at which current is available in an electrode. More specifically, the term is used to describe the conductive material in a fuel cell that collects electrons (i.e., on the anode side) or disburses electrons (i.e., on the cathode side). The current collectors are porous or microporous (to allow for fluid flow through them) and lie in between the catalyst/electrolyte surfaces and the bipolar plates.

"Electrolyte" refers to a non-metallic electrical conductor in which current is carried by the movement of ions. The electrolyte may also contain the electron transport mediator (ETM) or the ETM may be present in a domain matrix.

"Electron transport mediator" (ETM) means a substance that provides transport between the redox catalyst and electrode surface. As used herein, the terms "domain", "microdomain" and "domain matrix" will be used interchangeably and refer to an area within the electrode of the invention defined by the boundary of the current collector and either the containment material or the surface of another current collector. Typically domains are roughly spherical and have diameters of about 10 to about 100 μm.

The term "fluid association" as applied to the ETM and the redox catalyst means that neither the ETM nor the catalyst are immobilized in any fashion and are free to move in fluid fashion within the domain.

Electrode Elements and Structure

Figure 1:
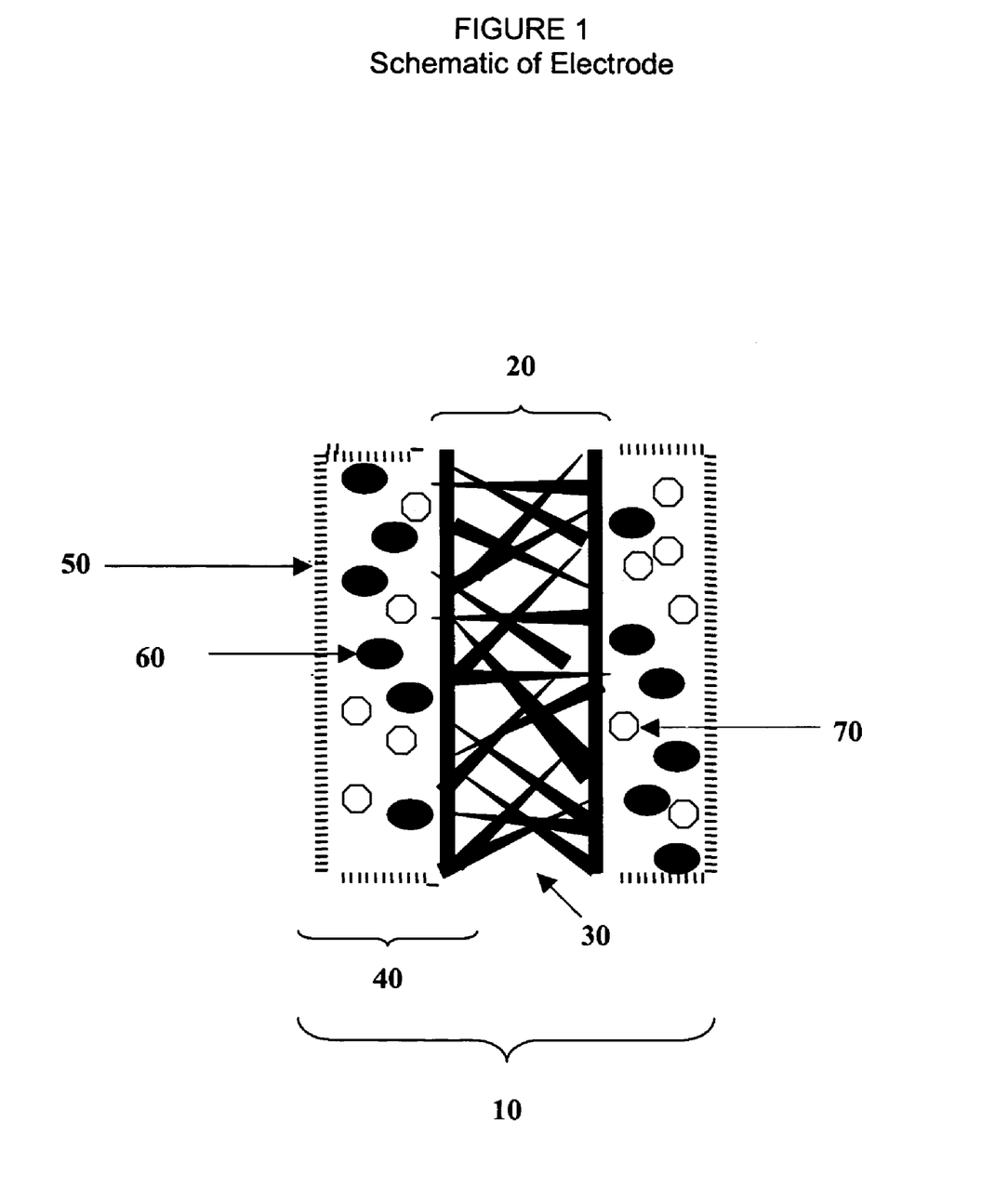
FIG. 1 illustrates the electrode of the invention.

The electrode of the invention is described in FIG. 1. Referring to FIG. 1, an electrode element (10) is comprised of a porous or microporous porous current collector (20), in contact with a multitude of domains (optionally created by a containment material (50)), each domain containing a redox catalyst (60) and an ETM (70). Each of these components will be discussed below in detail.

1. Current Collector

The current collector may take a variety of forms and be made of a number of different materials, but the result is a porous or microporous object within the electrode wherein electrons are available. The current collector forms one boundary of a domain (40). Components of the collector can be, but are not limited to: conductive fibers, particles, films, or combinations thereof, wherein the components are arranged to form the collector so that the collector is conductive in its entirety. Preferably the current collector comprises an electrical conducting material (30); for example, the material may be carbon, noble metals, or any other conductive material that is inert to the reactive conditions at the electrodes and that is capable of being formed into the element. Thus, non-limiting examples of a suitable electrical conducting material are: carbon paste, carbon nanotubes, carbon particles, conducting polymer particles, noble metal particles, conducting metal oxide particles and carbon paper.

The size of the components of the collector may be varied; but, in a preferred embodiment, the volume will be minimized so as to maximize the surface area available for current collection. Furthermore, the size of the components must be consistent with the preferred domain size. The macroscopic form of the current collector composed of these elements may be, but is not limited to: paper, cloth, porous monoliths, particle aggregates and arrays of these forms.

Figure 2:
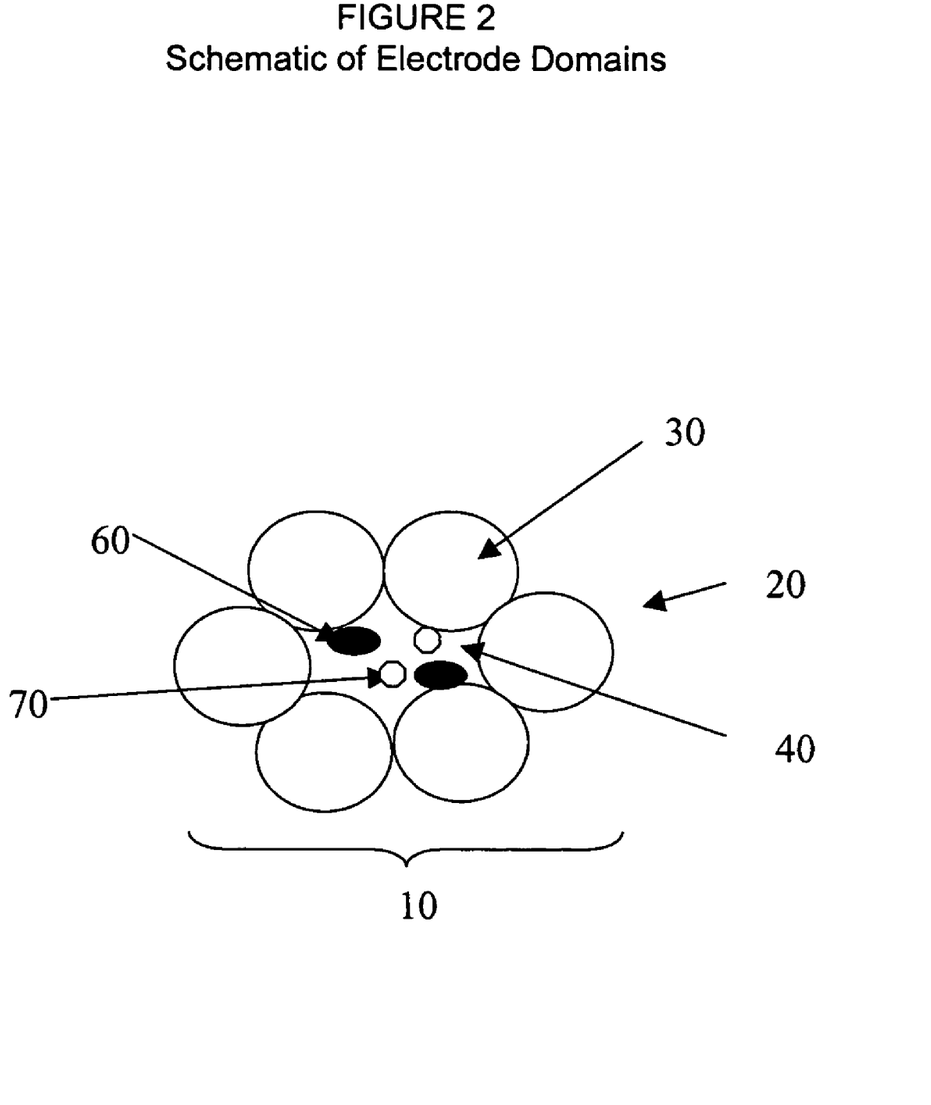
FIG. 2 illustrates an electrode having domains formed by the association of particulate current collectors.

In an alternate embodiment to that shown in FIG. 1, an electrode having similar function and interaction for use in a fuel cell may be formed with no containment material present. Specifically, the electrode may be formed by the association of electrical conducting materials, since the conducting materials form a boundary by virtue of their association (e.g., the juxtaposition of several nanoparticles that comprise current collectors). Referring to FIG. 2, an electrode element (10) is comprised of a porous or micro-porous current collector (20). Preferably the current collector comprises an electrical conducting material (30). The current collector may take a variety of forms. For example, the current collector may be a porous conducting film or a collection of smaller conducting particles (e.g., formed into a film or monolith or any other shape or array of conducting particles, formed by any printing or stamping technique known in the art). The current collector forms the boundary of a domain (40). In one embodiment the diameter of the domain (40) is less than about 100 μm, where less than about 10 μm is preferred. The entire electrode consists of a multitude of this structure in continuous contact. Optionally, the entire electrode containing the multiplicity of current collectors and domains may be constrained by a containment material.

2. Containment Material

Structurally, the containment material (50) may form a boundary of the microdomain (although it allows free flow of substrates and products to and from the microdomain). In a preferred embodiment, the distance from the wall of the current collector (30) to the containment material (50) is less than about 100 µm, where less than about 10 µm is preferred. The entire electrode consists of a multitude of this structure in continuous contact.

The containment material must be capable of being formed into a size and shape consistent with the preferred size and shape of the microdomain. Functionally, the containment material prevents loss of the redox catalyst and ETM from the domain. Thus, one possible form of the containment material of the invention is a permeable film of such a thickness so as to be consistent with the preferred domain size and of such a permeability so as to prevent egress of the redox catalyst and ETM from the domain. In another embodiment, a precursor to the containment material may be deposited on the collector element in precursor form and formed via polymerization of the precursor in place.

A number of materials will be useful as containment materials, e.g., polyelectrolyte polymers, permeable polymers, porous metal oxide-based coatings, organically modified metal oxides and fluorine-containing polymers. Preferred in the present invention are containment materials that take the form of films. The composition of the films may be inorganic (e.g., composed of silica, titania, alumina, etc.), organic (e.g., composed of polyesters, polyamides, polyimides, fluoropolymers, polyelectrolytes, etc.) or organic/inorganic (e.g., composed of organo-substituted silica, silicones, titania, etc.). Likewise, film precursors may be inorganic, organic or organic/inorganic in nature; non-limiting examples are tetraalkoxysilanes, organoalkoxy silanes, alkoxytitanates, and organic polymer precursors such as diamines, diacids, etc. Additionally the containment material may be silica or colloidial carbon.

3. Redox Catalysts

The invention provides a fuel cell electrode comprising a redox catalyst. Specifically, the redox catalyst (60) and an ETM (70) are found within a domain. The redox catalyst (60) and the ETM (70) are not immobilized, but instead are in fluid association with each other and are free to move within the domain.

The function of the redox catalyst is to catalyze an electrochemical reaction of an anode reductant or cathode oxidant, respectively. Redox catalysts may be comprised of species capable of reversibly transferring electrons including (but not limited to) enzymes and organometallic redox complexes. Preferred redox catalysts of the invention are enzymes.

A variety of enzymes are useful on the cathode including, for example: laccase and cytochrome C oxidase for electroreduction of oxygen; and, peroxidases for electroreduction of hydrogen peroxide. Similarly, useful enzymes on the anode include: hydrogenases for the electrooxidation of hydrogen; oxidases and dehydrogenases for electrooxidation of methanol, other alcohols, glucose, lactate and other substrates; alcohol oxidase, formaldehyde dehydrogenase and formate dehydrogenase for electrooxidation of methanol; pyranose oxidase for electrooxidation of D-glucose, L-sorbose and D-xylose; and, glucose oxidase, oligosaccharide dehydrogenase and pyrroloquinoline quinone (PQQ) glucose dehydrogenase for electrooxidation of glucose. A non-limiting list of enzymes useful in the present invention is given in U.S. Pat. No. 6,294,281, hereby incorporated by reference.

Preferred for use at the cathode and anode in the present invention are those enzymes selected from the oxido-reductase group, a group containing (but not limited to): laccase, ascorbate oxidase, cytochrome c oxidase, multi-copper oxidases, bilirubin oxidase, blue copper oxidases, alcohol oxidase, formaldehyde dehydrogenase and formate dehydrogenase, L-lactate dehydrogenase, malate dehydrogenase, glucose oxidase, microbial pyruvate oxidase, and catechol oxidase. Laccases are most preferred at the cathode in the invention herein.

In general, laccase (polyphenol-oxidase [EC 1.10.3.2]) is a multicopper oxidase that couples the one-electron oxidation of four substrate molecules to the four-electron reduction of dioxygen to water. Thus, laccase is useful for the biocatalytic reduction of dioxygen to water in electrochemical applications such as biofuel cells and biosensors. Several genes that encode different isoforms of laccase have been isolated and sequenced (e.g., *Trametes versicolor, T. pubescens, Coriolus hirsutus* and *Pleurotus ostreatus*); and, much work has been performed to biochemically characterize these enzymes (Galhaup C., et al., *Microbiology.* 2002 Jul;148(Pt 7):2159-2169; Leitner C., et al., *Appl Biochem Biotechnol.* 2002 Spring;98-100:497-507; Galhaup C., et al., *Appl Microbiol Biotechnol.* 2001 Jul;56(1-2):225-232; Gorbatova ON, et al., *Prikl Biokhim Mikrobiol.* 2000 May-Jun;36(3):272-277).

4. Electron Transport Mediators

Electron transport mediators (ETMs) (70) are in fluid association with the redox catalyst (60) in the electrode's domains. More specifically, the ETM (70) and the redox catalyst (60) are not immobilized, but instead are in fluid association with each other and are free to move within the domain.

ETMs serve to facilitate the transport of electrons from the current collector to the redox catalyst; and, their presence generally increases the efficiency of the electrode. One feature of the ETM is that its redox potential must be greater than (more positive than) or equal to the redox catalyst potential in the anode. Furthermore, the redox potential must be less than (more negative than) or equal to the redox catalyst potential in the cathode. Additionally, it is advantageous if the ETM is a molecule that can transfer electrons rapidly and reversibly with both the redox catalyst and the current collector. Another desirable feature is that the ETM not react directly with the substrate molecules and that it be stable in both the oxidized and reduced states. Additionally, it is preferred that the ETM have a large diffusion coefficient in fluid media.

Examples of the general classes of molecules that can function as ETMs are: quinones, hydroquinones, metalloorganic complexes, conjugated unsaturated acyclic and cyclic molecules (including aromatic systems), metal ions with and without ligands and biological electron carriers. One ETM that is particularly suitable in the present invention is 2,2'-azinobis(3-ethylbenzothiazoline-6-sulfonate) (ABTS).

The Electrode's Functionality In A Fuel Cell

When the electrode of the invention functions as a cathode, current is available at the current collector. Specifically, the following series of reactions occur:

1. A freely diffusing oxidized ETM molecule interacts with the current collector;
2. During the interaction, an electron(s) is transferred to the ETM, whereupon it becomes more reduced; and
3. The reduced ETM then encounters a freely diffusing oxidized redox catalyst, whereupon an electron(s) is transferred to the redox catalyst to thereby reduce it.

In one embodiment wherein the cathode is part of a fuel cell, the reduced redox catalyst can then interact with a consumable reducible substrate molecule (e.g., oxygen), whereupon an electron(s) is transferred to the substrate. This completes the catalytic action of the redox catalyst.

In the case where the electrode acts as an anode, the flow of electrons is reversed and an oxidizable substrate (e.g., methanol) provides the electrons that are transferred to the current collector via the redox catalyst and ETM. In one embodiment wherein the anode functions within a fuel cell, an oxidizable substrate provides the electrons that are transferred to the current collector via the redox catalyst and ETM.

In both the anode and cathode, substrate molecules enter the electrode from spaces bounding the electrodes via permeation through the containment element of the electrode. Similarly, reaction products from oxidation or reduction of the substrates egress through the permeable containment element into the interstitial spaces bounding the electrodes. While substrate and product molecules are free to permeate through the containment element, the redox catalyst and ETM are not.

A Fuel Cell Comprising The Electrode Of The Invention

Figure 3:
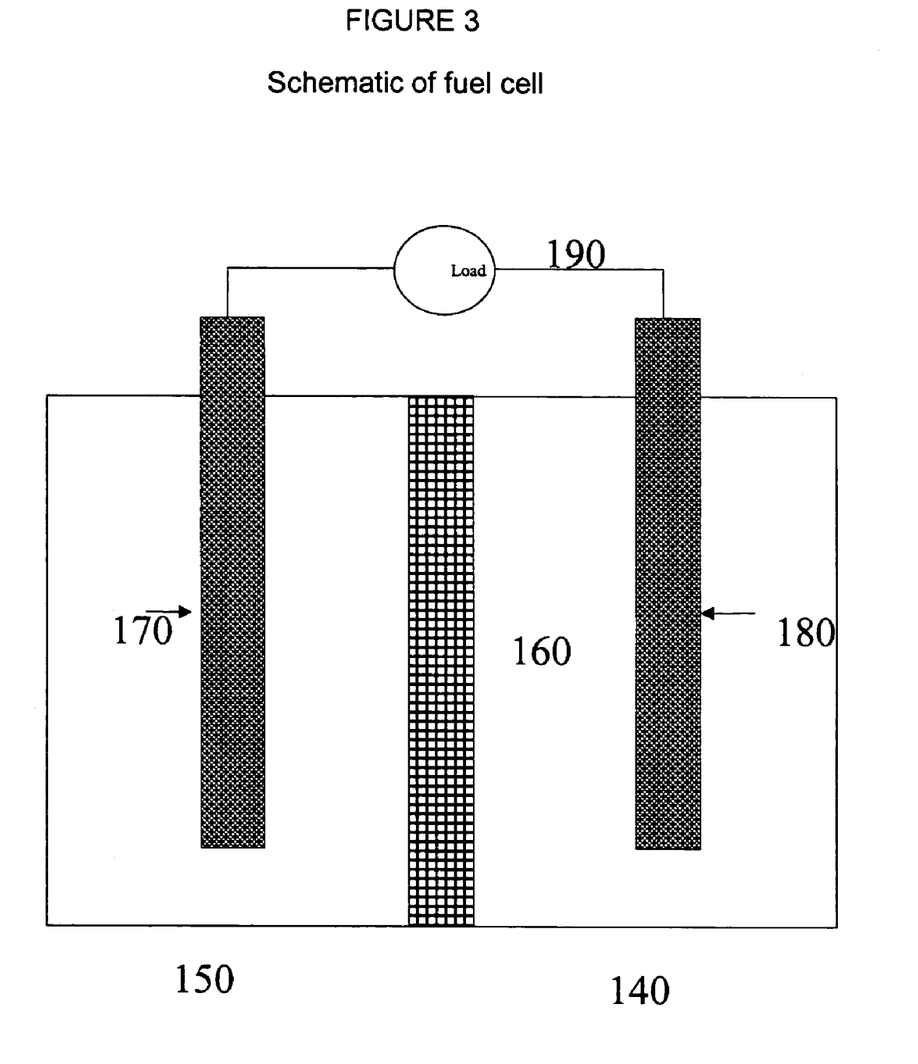
FIG. 3 illustrates a fuel cell comprising an electrode of the invention.

The electrode of the invention is designed to operate in a fuel cell. One example of such a fuel cell is seen in FIG. 3 (although alternate fuel cells utilizing the electrodes of the invention will be obvious to those skilled in the art). Referring to FIG. 3, the fuel cell consists of: 1.) a cathode compartment (140) containing a cathode (180); and 2.) an anode compartment (150) containing an anode (170). These two compartments are optionally separated by a membrane (e.g., an ion exchange membrane) (160) or other barrier between the anode and cathode that prevents mixing of the oxidant and reductant. The anode and cathode are connected though an external conductor which can also pass through a load (190) to produce useful work.

Generally, each compartment contains an electrolyte into which the electrodes are immersed and in intimate contact; or, alternatively, the electrodes are in physical contact with the membrane, obviating the need for electrolyte.

In preferred embodiments of the invention, the anode may consist of a porous current collector containing microdomains, wherein the anode microdomains contain a redox catalyst and associated ETM for oxidation of an oxidizable substrate. Similarly, the cathode may consist of a porous current collector containing the microdomains, wherein the cathode microdomains contain a redox catalyst and associated ETM for reduction of a reducible substrate. Substrates (i.e., oxidizable and reducible) may be present in the electrolyte of each compartment or added continuously.

Optionally the cathode and/or anode may consist of the porous current collector/microdomain assembly of the invention attached to a conductive solid or porous current collector.

Oxidizable and Reducible Substrates

As one of skill in the art is clearly aware, the particular substrates selected for use in a particular fuel cell are dependent on the configuration of the anode and cathode. More specifically, the particular substrate selected for use is dependent on the redox catalyst that the electrode contains. In preferred embodiments, the fuel cell comprises a cathode that is configured and arranged for electro-reducing oxygen and an anode that is configured and arranged for electro-oxidizing hydrogen, alcohols (e.g., methanol), carbohydrates (e.g., glucose), carboxylic acids (e.g., formic acid) or carboxylic esters (e.g., methyl formate).

Electrolytes

The function of the electrolyte in a fuel cell, in which protons are generated on the anode, is to expedite transportation of those protons to the cathode where reaction with an oxidant takes place. In a membrane-containing fuel cell, a proton exchange membrane serves to separate the anode from the cathode and also serves to conduct protons from the anode to the cathode. Examples of electrolytes include, but are not limited to: salts, acids and bases. The compounds may be in the form of dissolved salts, acids, or bases or may be in the form of polymeric salts, acids or bases. Preferred are salts that are also buffers. Examples include, but are not limited to, those salts containing phosphates, citrates and acetates. Especially preferred are salt buffers in the pH range of about 2-7.

Commerical Parameters Of A Fuel Cell

Fuel cell systems that are able to attain current densities of 50 mA or greater are particularly useful for commercial applications. An optimal system that would allow for a current density of greater than 50 mA (per $cm^2$ of projected electrode surface area) would have:

a microdomain with about $4 \times 10^{-9}$ moles of a redox catalyst and an ETM in a concentration of about $5 \times 10^{-3}$ M; and an effective volumetric surface area of the microporous current collector in excess of about 100 $cm^2$;

wherein all of the redox catalyst resides within about 3 μm of the effective current collector surface and all of the effective current collector surface resides within about 10 μm of a reservoir of air-saturated aqueous buffer. Preferred systems will include cathodes where the ETM has a redox potential that is less than 0.3 V positive of the redox potential of the catalyst, where less than 0.1 V positive of the redox potential of the catalyst is preferred. Similarly, preferred anodes will contain an ETM having a redox potential that is less than 0.3 V negative of the redox potential of the catalyst, where less than 0.1 V negative of the redox potential of the catalyst is preferred.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

General Methods

The meaning of abbreviations is as follows: "h" means hour(s), "min" means minute(s), "sec" means second(s), "d" means day(s), "μm" means micron(s), "μL" means microliter(s), "mL" means milliliters, "L" means liters, "μM" means micromolar, "mM" means millimolar, "M" means molar, "mA" means milliampere(s) and "V" means volt(s).

The redox convention used is that where the standard hydrogen electrode is 0 V.

Preparation Of Laccase Concentrate

Two grams of dry fermentation extract containing laccase from the white rot fungus *Trametes versicolor* (obtained from Wacker Chemie, Germany) was suspended in 40 mL of Bis-Tris propane buffer 20 mM pH 6. The solution was spun for 10 min at 20,000 rpm (50,000 g) in an SS-34 (Sorvall®) rotor. The supernatant was poured off and the pellet resuspended in an additional 40 mL of the same buffer. The suspension was again spun at 20,000 rpm for 10 min in the same rotor. The supernatants were pooled and concentrated in an Amicon concentrator to 20 mL using a YM-30 (Millipore) membrane. The solution was diluted up to 200 mL with the Bis-Tris propane buffer and concentrated back down to 15-20 mL.

This step was repeated once more to give a final volume of 20 mL. The enzyme solution was aliquoted into 0.25 mL volumes in Eppendorf tubes and quick frozen in liquid nitrogen. The samples were stored in an −80° C. freezer until use.

For each experiment described below, a 60 nM solution of laccase in 20 mM pH 6 Bis-Tris propane buffer was used.

Chronoamperometry For The Determination Of Electrode Function

Electrodes were evaluated via the electrochemical measuring technique of chronoamperometry. Specifically, a constant voltage was applied to an electrode and the resultant current was recorded as a function of time. In the case of a cathodic electrode, the measured current results from consumption of electrons at the cathode by substrate. The cathodes of the present invention consume electrons via laccase-catalyzed reduction of oxygen to water. Electrons are transported to the laccase via an electron transport mediator (ETM). The initial pH of the electrolyte was set at 3 for optimal laccase performance and because of the need to supply protons to complete the reduction of oxygen to water. The electrolyte may also contain the ETM or the ETM may be present in the domain matrix.

Example 1

Laccase Cathodes With Various Containment Materials

This example demonstrates the construction of a variety of laccase electrodes, wherein the current collector was carbon paper and the containment material was silica or colloidial carbon.

Silica As Containment Material

Laccase solution (12 µl) was applied to the bottom portion of a strip of Toray carbon paper (360 µm thick, 6 mm wide and 7 cm long). After drying, 24 µl of 20 mM ABTS in 50 mM pH 3 phosphate buffer was added to the same area as the laccase and dried. The applied portion of the paper was dipped into a stirred mixture of 200µl 50 mM pH 3 phosphate buffer and 2 mL of tetramethoxysilane. The dipped paper was cured in a chamber at nearly constant 100% humidity for 2 days.

The activity of the electrode was tested by immersing the electrode in 28 mL of 50 mM pH 3 phosphate buffer electrolyte and 1 mM ABTS. Also immersed were a SCE reference electrode and a Pt coil counter electrode. All of these components were connected to the leads of a potentiostat. A voltage of 0.2 V was applied to the cathode and current draw measured by the potentiostat versus time. A current of 1.6 mA/cm$^2$ of cathode surface was measured after 1800 sec in bubbling oxygen. To demonstrate electrode stability, the electrode was then removed from the ABTS electrolyte and immersed in fresh ABTS electrolyte and the chronoamperometry procedure repeated. After another repeat of this procedure, the current was 80% of the original value. This demonstrated that the laccase catalyst was effectively contained within the domain matrix and retained activity.

Colloidal Carbon As Containment Material

Laccase solution (12 µl) was applied to the bottom portion of a strip of Toray carbon paper (360 µm thick, 6 mm wide and 7 cm long). Additionally, 24 µl 20 mM ABTS in 50 mM pH 3 phosphate buffer and 100 µl. of RTU colloidal carbon (Alfa Aesar, Catalog #41774) was applied to the same area as the laccase. The paper was dried for 2 hrs.

Electrode activity was tested in a similar method as described above. Specifically, the electrode displayed 2.5 mA/cm$^2$ current after 1200 sec; in a similar series of experiments to demonstrate the stability, the electrode retained 100% of its original value.

Example 2 (Comparative)

Evaluation Of Inferior Laccase Cathodes

This example describes the performance of cathodes that lacked contained and localized domains, containment material, or appropriate orientation of redox catalyst and containment material. As expected, the performance of each of the cathodes described below was inferior to those described in Example 1.

Cathodes Without Contained And Localized Domains

A strip of Toray carbon paper (360 µm thick, 6 mm wide and 7 cm long) was immersed in a mixture of 24 µl of laccase solution and 24 mL of 1 mM ABTS in 50 mM pH 3 phosphate electrolyte to a depth of 2 cm. Chronoamperometry was performed as in Example 1 above. The performance was 1 mA/cm$^2$ initially, but decayed to 0.4 mA within 1 hr.

Cathodes Without Containment Material

A cathode was made by drying 12 µl laccase solution and 24 µl 20 mM ABTS in 50 mM pH 3 phosphate electrolyte sequentially on the bottom 2 cm of a strip of Toray carbon paper (360 µm thick, 6 mm wide and 7 cm long). Chronoamperometry was performed as in Example 1. Performance was 2.3 mA/cm$^2$ in oxygen after 1100 sec; however, this value declined to 56% of original after the ABTS change-out procedure described in Example 1.

Cathodes With Redox Catalyst On Top Of Containment Material

A cathode was made by drying 100 µl RTU colloidal carbon (Alfa Aesar, Catalog #41774) on a Toray carbon paper strip (360 µm thick, 6 mm wide and 7 cm long). This was immersed in a mixture of 24 µl laccase solution and 24 mL 1 mM ABTS in 50 mM pH 3 phosphate electrolyte to a depth of 2 cm. Chronoamperometry was performed as in Example 1 above. The initial current was only 0.5 mA/cm$^2$ after 1400 sec.

Example 3 (Prophetic)

Optimal Current Density

In order to construct a cathode that can produce sufficient current density, both the redox catalyst activity and the electrode microstructure should be optimized. Using predictive equations well known in the field (i.e., Ikeda et al., *J. Electroanal. Chem.* 2001, 496:69-75 and *Anal. Sci.* 2000, 16:1013), it can be shown that a cathode in which a microporous current collector incorporates microdomains of laccase and ETM in fluid association can be constructed wherein the current collector is capable of producing in excess of 100 mA/cm$^2$ of external surface area. For the modeling, laccase of the type used in the above examples is used as redox catalyst, with values of $k_{cat}$, $K_M$ and $K_S$ as measured for this enzyme in homogeneous buffer solution. The electron diffusion coefficient for the ABTS ETM (Palmore et al., *J. Electroanal. Chem.* 1999, 464:110-117) is as measured in homogeneous buffer solution, as well as the standard diffusion coefficient for oxygen in water. Specifically, in order to produce the desired current density:

the microdomain volume must contain $4 \times 10^{-9}$ moles of laccase and ETM in a concentration of $5 \times 10^{-3}$ M;

the effective volumetric surface area of the microporous current collector must be in excess of 100 cm$^2$;

all of the redox catalyst must reside within 3 μm of the effective current collector surface; and, all of the effective current collector surface must reside within 10 μm of a reservoir of air-saturated aqueous buffer.

Example 4

Laccase Cathodes With Various Domain Matrices

This example demonstrates the construction of laccase electrodes having various domain matrices (i.e., of gold nanoparticles, carbon particles and silver particles, respectively).

Following preparation of each porous domain matrix (infra), the matrix was connected to a standard flat conducting working electrode using double-sided conducting carbon tape, where the tape completely covered the original electrode. Control experiments with the tape itself did not lead to significant catalytic currents.

Electrochemistry was carried out in 50 mM pH 3 phosphate buffer using laccase enzyme (15 μl in 2 mL) and recrystallized ABTS (0.25 mM) as the ETM. Oxygen was continually bubbled through the solution, to stir the solution and provide an oxygen-saturated solution. Catalytic current was measured; this current was produced due to the reduction of ABTS, which in turn reduced laccase, which then reduced oxygen at 0.2 V.

Domain Matrix Of Gold Nanoparticles

First, a gold seed solution was prepared as follows: A 0.25 mM solution of HAuCl$_4$ was boiled (250 mL). To this, 7.5 mL of 1 wt % sodium citrate was added and the solution boiled for another 30 min. After cooling, this seed solution was used as described below to create a gold film.

The seed solution (4.8 mL) was added to 100 mL of water, and 49.8 mL of a 10 mM HAuCl$_4$ solution added. Next, 200 mL of 4 mM ascorbic acid was added at 2 mL per min and then the gold solution was left to stir overnight. The water-based solution of gold nanoparticles (50 mL; about 100 nm in size) was filtered using a 0.2 μm sized alumina filter (about 1 inch diameter). The filtered gold on the filter was left to dry and a gold film resulted (about 2-3 μm thick) that could be peeled away from the filter, thus producing a free-standing gold foil. A typical scanning electron microsopy image of the particles revealed a porous film.

The gold film was cut into about 2×2 mm sized pieces for electrochemical experiments. The porous gold film was connected to a standard flat conducting working electrode and electrochemistry was carried out (as described above). The catalytic current was about 0.38 mA/cm$^2$.

For comparison, a commercially available bulk (nonporous) gold electrode was used in a similar experiment. The current was about 0.015 mA/cm$^2$, measured as the current at 0 V versus a silver/silver chloride electrode. Thus, in the case of the porous electrode, current was approximately 25 times that of the bulk metal.

Domain Matrix Consisting Of Carbon Particles

Carbon powder (Vulcan XC72; 0.1 g) was added to 250 g of water and 50 mL of this solution was filtered using a 0.2 μm sized alumina filter (about 1 inch diameter). The filter cake was dried at 50° C. overnight. A razor blade was used to cut a sample approximately 2×2 mm and the powder cake was connected to a standard flat conducting working electrode (as described above). Prior to electrochemistry, the electrode was dipped in ethanol first and then rinsed in water to ensure wetting. Using the porous carbon electrode, the current measured at 0 V was about 1.75 mA/cm$^2$.

Domain Matrix Consisting Of Silver Particles

Silver-based electrodes were made by pressing 0.3 g of 1 μm sized silver spheres at 5000 psi (34.47 MPa) in a 1 cm die for 1 min. The sample was removed and heated under nitrogen for 1 hr at 230° C.

A sample ca. 1 mm by 1 mm was connected to a standard flat conducting working electrode (as described in this example). Prior to electrochemistry, the electrode was dipped in ethanol first and then rinsed in water to ensure wetting. Using the porous silver electrode, the current measured at 0 V was about 2.1 mA/cm$^2$.

Example 5

Laccase Cathodes Utilizing Channeled Domain Matrices

This example demonstrates the construction of laccase electrodes having domain matrices with channels. Specifically, channels were formed in a domain matrix of gold nanoparticles by soft lithography and channels were formed in a domain matrix of silver particles by high pressure.

Following preparation of each channeled domain matrix (infra), electrochemistry was carried out in 50 mM pH 3 phosphate buffer using laccase enzyme (15 μl in 2 mL) and recrystallized ABTS (0.25 mM) as the ETM. Oxygen was continually bubbled through the solution, to stir the solution and provide an oxygen-saturated solution. Catalytic current was measured.

Gold Nanoparticles And Channels Formed By Soft Lithography

A soft lithographic mask with channels about 2-3 μm deep was filled with the gold solution of Example 4. The solution was left to dry overnight and the process was repeated once. The dried material was transferred to double-sided carbon tape by pressing the tape onto the surface of the gold/mask, at which point the gold imprint became transferred onto the working electrode. A typical scanning electron microscope image showed that the electrode consisted of both porous particles and channels about 2-3 μm deep. The gold leaves were essentially an imprint of the 'soft mask'. Excellent registry of the original mask was obtained.

The current measured at 0 V was about 0.5 mA/cm$^2$.

Silver Particles And Channels Formed From A Metal Grid

Highly textured silver based particulate electrodes were made by pressing the surface of powdered silver (0.3 g) with porous TEM grids at 5000 psi (34.47 MPa). After 5 min, the TEM grid was removed to reveal a highly textured imprint. The surface can best be described as having the appearance of porous pillars. Electron micrographs showed that the resulting pillars varied in size but typically had dimensions of 20 μm×20 μm wide by ca. 5 μm deep. These pillars sat on a flat bed of porous silver particles.

Electrodes were made by using a razor blade to cut out a section of about 2×2 mm, and the textured surface was heated at 230° C. for 1 hr. In the case of the porous and textured silver electrodes the current measured at 0 V was about 4 mA/cm$^2$, which was higher than current measured using the non-textured surface (i.e., 2.1 mA/cm$^2$; see Example 4).

Example 6

Methanol Fuel Cell

A direct methanol fuel cell was constructed consisting of a split H configuration electrolytic cell separated by a Nafion® 117 membrane. The capacity of each half cell was approximately 45 mL. The anode compartment contained the anode and 0.9 M methanol in 1.0 M $H_2SO_4$. The cathode compartment contained the cathode, 1.0 mM ABTS in 50 mM pH 3 phosphate buffer and a gas bubbler. The anode and cathode were connected through a decade resistance box. In parallel with the resistance box was a voltmeter and in series with the box was an ammeter.

The anode was prepared by application of Pt/Ru inks to 360 µm thick carbon paper. The inks were made by mixing E-TEK 40% 1:1 Pt/Ru alloy on Vulcan XC-72 carbon with water and Nafion® emulsion in a high shear mixer. The mixture was spread onto the carbon paper and allowed to dry at room temperature. Loading was about 1 mg metals/cm$^2$; the anode contained 5 cm$^2$ active area. Anodes were conditioned by repetitive voltage scans in 1.0 M $H_2SO_4$ from −0.1 to 1.0 V until the cyclic voltammogram became constant.

Laccase (12 µl) was applied to the bottom portion of a strip of Toray carbon paper (360 µm thick, 6 mm wide and 7 cm long). Additionally, 24 µl 20 mM ABTS in 50 mM pH 3 phosphate buffer and 100 µl of RTU colloidal carbon (Alfa Aesar, Catalog #41774) was applied to the same area as the laccase. The paper was dried for 2 hrs. Loading of the laccase was approximately 0.02 mg/cm$^2$ on the strip; the active cathode area represented 6 cm$^2$ geometric surface area. No conditioning was necessary for the laccase cathode.

The cathode side of the fuel cell was purged with bubbling air. Loads across the cell were cascaded from 100 k ohms down to 10 ohms. At each intermediate resistance, full cell voltage drop and current were recorded. At a constant load of 100 ohms, current from the fuel cell measured 1.2 mA at 0.2 V and was constant for 100 min.

What is claimed is:

1. A fuel cell electrode comprising a porous current collector comprising an electrical conducting material in contact with a multitude of domains, each domain containing:
    a) a redox catalyst; and
    b) an electron transport mediator;
    wherein the redox catalyst and electron transport mediator are in fluid association with each other within the domain and wherein the redox catalyst and the electron transport mediator are bounded in the domain by the porous current collector and a containment material, wherein said containment material is selected from the group consisting of carbon, silica, titania, alumina, polyesters, polyamides, polyimides, fluoropolymers, polyelectrolytes, organosubstituted silica, silicones, organosubstituted titania, and organo metal oxides.

2. A fuel cell electrode according to claim 1 wherein the electrical conducting material is selected from the group consisting of: carbon paper, carbon paste, carbon nanotubes, carbon particles, conducting polymers, noble metal particles and conducting metal oxide particles.

3. A fuel cell electrode according to claim 1 wherein the diameter of the domain is less than 100 µm.

4. A fuel cell electrode according to claim 1 wherein the diameter of the domain is less than 10 µm.

5. A fuel cell electrode according to claim 1 wherein the redox catalyst is an enzyme.

6. A fuel cell electrode according to claim 5 wherein the enzyme is an oxido-reductase.

7. A fuel cell electrode according to claim 6 wherein the electrode is a cathode and the oxido-reductase is laccase.

8. A fuel cell electrode according to claim 1 wherein the electrode is a cathode and the electron transport mediator has a redox potential that is less than 0.3 V positive of the redox potential of the catalyst.

9. A fuel cell electrode according to claim 1 wherein the electrode is a cathode and the electron transport mediator has a redox potential that is less than 0.1 V positive of the redox potential of the catalyst.

10. A fuel cell electrode according to claim 1 wherein the electrode is an anode and the electron transport mediator has a redox potential that is less than 0.3 V negative of the redox potential of the catalyst.

11. A fuel cell electrode according to claim 1 wherein the electrode is an anode and the electron transport mediator has a redox potential that is less than 0.1 V negative of the redox potential of the catalyst.

12. A fuel cell electrode according to claim 1 wherein the electron transport mediator is selected from the group consisting of: quinones, hydroquinones, metalloorganic complexes, conjugated unsaturated acyclic and cyclic molecules, metal ions and biological electron carriers.

13. A fuel cell electrode according to claim 1 wherein the electrode is a cathode and the electron transport mediator is 2,2'-azinobis(3-ethylbenzothiazoline-6-sulfonate).

14. A fuel cell electrode according to claim 1, wherein said electrode produces in excess of 50 mA per cm$^2$ of projected electrode surface area.

15. A fuel cell electrode according to claim 14 having the following parameters:
    a) a microdomain with about $4 \times 10^{-9}$ moles of a redox catalyst;
    b) an electron transport mediator in a concentration of about $5 \times 10^{-3}$ M;
    c) an effective volumetric surface area of the microporous current collector in excess of 100 cm$^2$;
    wherein all of the redox catalyst resides within about 3 µm of the current collector surface, and all of the current collector surface resides within 10 µm of a reservoir of air-saturated aqueous buffer.

* * * * *

UNITED STATES PATENT AND TRADEMARK OFFICE
CERTIFICATE OF CORRECTION

PATENT NO. : 7,615,293 B2
APPLICATION NO. : 10/932371
DATED : November 10, 2009
INVENTOR(S) : Farneth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Nineteenth Day of October, 2010

David J. Kappos
*Director of the United States Patent and Trademark Office*